United States Patent [19]
Hoo et al.

[11] Patent Number: 5,762,503
[45] Date of Patent: Jun. 9, 1998

[54] SYSTEM FOR USE AS A TEAM BUILDING EXERCISE

[75] Inventors: Joel Hoo; Toshi A. Hoo. both of Brookline. Mass.

[73] Assignee: Smart Productivity. Brookline. Mass.

[21] Appl. No.: 663,473

[22] Filed: Jun. 13, 1996

[51] Int. Cl.⁶ .................................................. G09B 19/00
[52] U.S. Cl. ................................ 434/237; 434/255; 463/6
[58] Field of Search ............................. 434/224, 247,
434/255, 237, 238, 236; 273/444, 441;
462/902, 14, 51, 74, 8; 463/6, 7

[56] References Cited

U.S. PATENT DOCUMENTS

| | | | |
|---|---|---|---|
| 3,834,702 | 9/1974 | Bliss | 482/8 |
| 3,846,704 | 11/1974 | Bessette | 434/255 |
| 4,144,568 | 3/1979 | Hiller et al. | 482/8 |
| 4,169,588 | 10/1979 | Miffitt | 482/8 |
| 4,278,095 | 7/1981 | Lapeyore | 482/8 |
| 4,533,144 | 8/1985 | Juarez et al. | |
| 4,534,557 | 8/1985 | Bigelow et al. | 434/247 |
| 4,752,069 | 6/1988 | Okada | 463/7 |
| 5,213,555 | 5/1993 | Hood et al. | 482/902 |
| 5,320,358 | 6/1994 | Jones | |
| 5,320,362 | 6/1994 | Bear et al. | |
| 5,354,057 | 10/1994 | Pruitt et al. | |
| 5,362,069 | 11/1994 | Hall-Tipping | 482/902 |
| 5,435,563 | 7/1995 | Arima et al. | 463/6 |
| 5,461,227 | 10/1995 | Blau | |
| 5,462,503 | 10/1995 | Benjamin et al. | 482/902 |
| 5,591,104 | 1/1997 | Andrus et al. | 434/247 |

FOREIGN PATENT DOCUMENTS 2175508  12/1986  United Kingdom ............ 482/74

OTHER PUBLICATIONS

Product Literature from Interel, Inc., 140 Carl Street, San Francisco, CA 94117.

*Primary Examiner*—Paul J. Hirsch
*Attorney, Agent, or Firm*—Cesari and McKenna, LLP

[57] ABSTRACT

A system of interconnected electronic components for use either as a team building or management training exercise or as a game. The system generally includes a plurality of monitors, such as low-power lasers, proximity detectors, noise detectors, infrared receivers, weight detectors or other like instruments arranged and configured in a given space as an obstacle course. Each monitor includes a corresponding sensor that notifies a control engine when the monitor has been triggered, e.g., when a particular laser beam is interrupted or when a particular proximity detector senses a nearby object. The control engine dynamically processes these events to tabulate and manifest the triggering of the monitors.

7 Claims, 5 Drawing Sheets

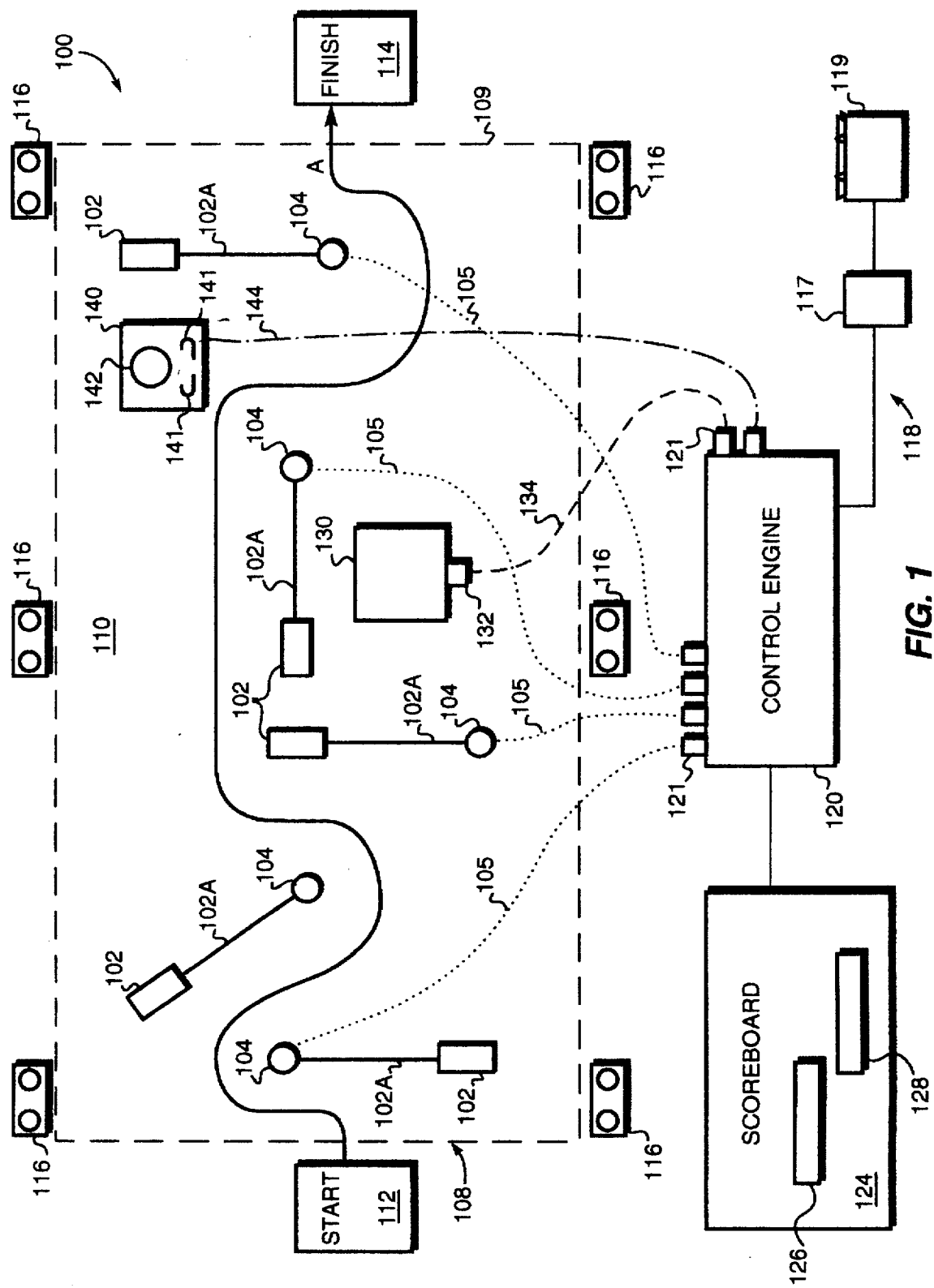

SYSTEM FOR USE AS A TEAM BUILDING EXERCISE

FIELD OF THE INVENTION

The present invention relates generally to systems for use in team building or management training exercises. More specifically, the present invention relates to an interactive system of monitors, such as laser beams, arranged and configured as an obstacle course and connected to other components for monitoring and displaying information relating to such monitors.

BACKGROUND OF THE INVENTION

Corporations and other organizations have long used various devices or exercises in an effort to improve the efficiency and capability of their employees, particularly management employees. These devices and exercises are typically designed to increase employee confidence and to create cohesive teams within the organization. One such device or exercise is to present a mock problem or task to a preselected team of employees that requires the team to act together and to identify and draw upon the unique strengths of the team members in order to solve the problem.

One such device is a physically challenging obstacle course. To negotiate a well-designed obstacle course, a team must think quickly, act together as a single unit and assist each other through difficult sections of the course. Obstacle courses also draw upon the team's creativity when attempting to negotiate particularly difficult sections, such as high walls or moats. By completing such a course, participants often experience a strong sense of accomplishment and a heightened confidence which may translate to the work environment in their willingness to take on and solve difficult problems as a team. Importantly, these exercises also identify those individuals who have difficulty working in a team environment.

The conventional obstacle courses, however, have many drawbacks. First, they are typically permanent, outdoor facilities located at a substantial distance from the interested organization. Furthermore, since the courses typically include relatively fixed structures, such as rope swings, high walls, log bridges, etc., they cannot be modified or tailored to a specific organization's needs. This fixed or static aspect of conventional obstacle courses also prevents them from being used more than once by the same group, since the group presumably learned to "solve" the course after the first pass.

Furthermore, conventional obstacle courses provide little objective measure of a team's performance. Typically, the only measure of performance is the time required to complete the course. Thus, the organization receives little or no objective information which might otherwise be implemented, for example in forming groups within the organization. Moreover, due to the inherent and often substantial differences between any two conventional courses, comparisons in performance between any two courses is generally not possible.

In addition to conventional obstacle courses, it is also known to combine various electronic devices such as laser emitters and receivers, contact sensors, etc. into a combat game. For example, U.S. Pat. No. 5,354,057 entitled SIMULATED COMBAT ENTERTAINMENT SYSTEM by Pruitt et al., discloses a system for individually monitoring and scoring a number of combatants carrying a variety of simulated weapons as they physically traverse a large outdoor area and encounter opposing combatants and other various targets. In particular, the system divides the area into a number of grids, each grid containing a centrally located transceiver for receiving information from a data collection service unit carried by each combatant. The transceiver in each grid then transmits this information to a centralized computer workstation operated by a game master. More specifically, each data collection service unit communicates with the simulated weapons carried by the combatant and records and transmits "hits" made by the combatant with his weapons. The service unit also communicates with sensors located on the combatant himself to record and communicate whenever the combatant is "hit" by others. Video cameras may be located throughout the game area so that the game master can monitor the positions of the combatants. Similarly, proximity detectors can be located in the game area to identify the locations of the combatants and/or to automatically trigger various events on the playing field, such as simulated laser weapons or the appearance of apparitions. Each grid may also include triangulation receivers to continually monitor the position of the combatants within the grid.

Pruitt et al., however, does not implement or disclose the use of monitors that are to be negotiated by players or team members. Instead, the objective is to engage other combatants directly with the simulated weapons in order to score "hits". The game described therein also does not arrange or configure any devices such as motion detectors into an obstacle course format. The game also fails to provide a team building or learning environment for both players and observers.

SUMMARY OF THE INVENTION

It is an object of the present invention to provide a highly flexible, interactive system arranged primarily as an obstacle course.

It is another object of the invention to provide a system that promotes the development of teamwork among the players.

It is another object of the invention to provide an entertaining system or game that includes elements that must be negotiated by the players.

It is another object of the invention to provide a flexible obstacle course that in addition to elements that are to be negotiated also includes components that must be engaged and solved by the team members.

Briefly, the invention comprises a system of electronic components manipulated by a control engine for use either as a team building or management training exercise or as a game. The system generally includes a plurality of monitors, such as low-power lasers, proximity detectors, noise detectors, infrared receivers, weight detectors or other like instruments configured and arranged in a given space as an obstacle course. Each monitor includes a corresponding sensor for notifying the control engine whenever the monitor associated with that sensor has been triggered, e.g., when a particular laser beam is interrupted or when a particular proximity detector senses a nearby object. The control engine dynamically processes these events to tabulate and manifest the triggering of the monitors.

Preferably, the monitors are configured and arranged so that at least one "path" exists for negotiating the course without triggering (e.g., setting off) any of the monitors. The object, moreover, may be to trigger as few monitors as possible while negotiating the course as quickly as possible. It should be understood, however, that the monitors may also be configured and arranged so that a team negotiating the course is meant to trigger one or more monitors.

The control engine which comprises, inter alia, both hardware and software elements continuously receives status information from the sensors and dynamically responds thereto. For example, the control engine may be connected to a scoreboard or display that provides continuous feedback to the team negotiating the course and/or to those observing the team's progress. That is, in response to the status information that it receives from the sensors, the control engine may direct the scoreboard to display an up-to-the-minute score that is representative of the number of monitors that have been triggered. The scoreboard may further include a clock also operated by the control engine for displaying elapsed time.

The control engine may also be used to activate or deactivate certain monitors dynamically, thereby altering the correct "path" even while a team is attempting to negotiate the course. Specifically, the control engine may include timing circuits or other elements to control the operation of the monitors disposed about the course. The timing circuits can also control specific monitors so that, for example, a given laser beam can be "on" for fifteen seconds then "off" for five seconds.

The control engine may also manifest the triggering of monitors to the team via a plurality of visual indicators and/or aural alarms. For example, a set of indicators lights manipulated by the control engine may be disposed around the perimeter of the course. In response to the triggering of a monitor, the control engine through its hardware and software elements may issue a command or control signal directing the indicator lights to turn from green to flashing red. Furthermore, a separate and distinct aural alarm may be assigned to each monitor such that the alarm is activated by the control engine whenever the monitor associated with that sensor is triggered.

For example, the system may include an audio system including a digital sampling device containing a database of pre-recorded and/or synthesized sounds. The audio system may be operated by the control engine to manifest in real time the triggering of individual monitors by a team negotiating the course. That is, upon triggering a monitor, the control engine may direct the audio system to play back to the team a distinct sound from the digital sampling device to further manifest the triggering of the monitor. Consequently, the first monitor may be associated with the sound of breaking glass such that whenever the first monitor is triggered, the control engine causes the audio system to play that selected sound. Similarly, the second monitor may be associated with the sound of a barking dog and so on. In this manner, the team negotiating the course is provided with immediate feedback on its progress, thereby assisting the team in determining whenever a particular monitor has been triggered.

In addition to the monitors, the course may also include at least one challenge station connected to the control engine for presenting a task to be performed by the team members negotiating the course. For example, the team members may be presented with a puzzle that must be solved. The puzzle may be a series of bent pipe pieces to be arranged into a circular depression and rotated in order to close a pair of electronic switches. By solving the puzzle and thereby closing the switches, a signal is sent to the control engine notifying it that the puzzle was correctly solved. The control engine may then manifest this achievement in a variety of ways, including awarding the team bonus points, decrementing the counter to improve the team's score, etc.

In addition to the lights and aural alarms, the control engine may be connected to various electromechanical "hazards" arranged along the obstacle course in order to alter the course environment in real time. For example, by connecting the control engine to a supply of water suspended above a portion of the obstacle course, the water can be selectively released causing it to "rain" on that part of the course. More specifically, the control engine may be programmed to operate (e.g., open or close) an electro-mechanical valve located at the water supply so that the valve is opened or closed in response to a particular monitor being triggered or in response to some other event. Similarly, the control engine can move or operate other physical objects disposed about the course through the use of additional electromechanical motors or devices.

In another aspect of the invention, the control engine includes a main processing element, such as a personal computer. By including a processor with resident software, the control engine gains added flexibility and greater control over the course. For example, the processor preferably provides: the ability to store and manipulate data regarding each team's performance through the course; the ability to provide greater dynamic control over the course layout and the hazards; the ability to expand the types of challenge stations that may be implemented; and the ability to present or display additional information to the participants and/or observers, such as rules, hints, techniques, company-specific information, etc., further improving the system's use as a management training or team building exercise.

In this particular aspect of the invention, the status information associated with each sensor preferably includes a unique identifier or address that is compatible with and may be recognized by the processor. Thus, in response to inputs from a course administrator at the processor or automatically at preset times or at the occurrence of linked events, the processor may send control signals to turn individual monitors, e.g., laser beams, proximity detectors, etc., on and off, to operate the hazards and control the challenge stations. This can be done even while a particular team attempts to negotiate the course.

The processor, moreover, preferably stores information regarding a team's completion of the course in a portion of memory for subsequent access, review and manipulation. As mentioned above, this information would include the time required to complete the course, the total number of monitors triggered, which monitors were triggered, the length of time that the monitors were triggered, whether certain hazards were activated, etc. As these events occur, they may also be time/date encoded by the processor for additional processing as described below.

The system via the control engine can also impose penalties on a team. For example, a team could be assessed a penalty for leaving members behind on a section of the course, for breaking course rules, etc. All of this information could then be tabulated or otherwise manipulated by the processor to provide an overall score for each team that "ran" the course. Furthermore, the scores from various teams may be compared to assess different team's abilities to work together, the history of a particular team's performance over multiple passes through the course, etc. The data would also show which particular section of the course a given team had the most difficulty solving. Scores could also be "weighted" depending on the complexity of the particular course and thereby made comparable to scores based on other course layouts. The data could also be reformatted for use on standard spreadsheet applications such as Lotus 1-2-3® or Microsoft Excel®. The system is thus capable of providing much greater analysis and feedback to the sponsoring organization as compared to conventional obstacle courses.

Rather than having an electronic scoreboard, the processor enhanced control engine may be connected to various display devices, such as a video/data projector for displaying score and elapsed time. Through the video/data projector, the control engine can also display a demonstration video, the rules of the obstacle course, course objectives, hints or techniques for solving particular portions of the course, etc. The display devices can also be used to display instructional materials specific to the sponsoring organization.

Other computers or processors may also be networked to the main processor and thus included within the control engine to add still more functionality to the system. For example, each participant may be provided with a transmitter that sends an identifying signal corresponding to that participant as the participant negotiates the course. By placing triangulation transceivers around the course that periodically poll the transmitters of each of the participants, this additional processor or tracking computer can follow each participant's progress through the course. This tracking information, moreover, can be time/date encoded by the control engine so that it may be synchronized with other events occurring on the course such as the triggering of specific monitors and the activation of various hazards that are also time/date encoded by the control engine.

Another processor of the control engine can be used to run a 2-D or 3-D graphics station to provide a simulated video histogram of a team's progress through the course. This processor may receive and store time/date encoded information across the network from the other computers/processors regarding when and which monitors were triggered, where each participant was throughout the team's negotiation of the course, etc. Following the exercise, the graphics station may be used to display a simulated 2-D or 3-D representation of a particular team's progress through the course showing which team member triggered which monitors and so on.

This 2-D or 3-D representation may be enhanced by adding images from a corresponding video recording of the team' performance. Specifically, a set of video cameras may be arrayed about the course for visually recording a team's progress. The video cameras are preferably connected to the control engine via the main processor for time/date encoding of the video data as well. As a result, when viewing the simulated 2-D or 3-D representation at the graphics station, a portion of the screen could display the previously recorded video images in synchronization with the 2-D or 3-D representation.

BRIEF DESCRIPTION OF THE DRAWINGS

The above and further advantages of the invention may be better understood by referring to the following description in conjunction with the accompanying drawings, in which:

FIG. 1 is a highly schematic illustration of the system of the present invention;

DESCRIPTION OF THE PREFERRED EMBODIMENT

Figure 2A:
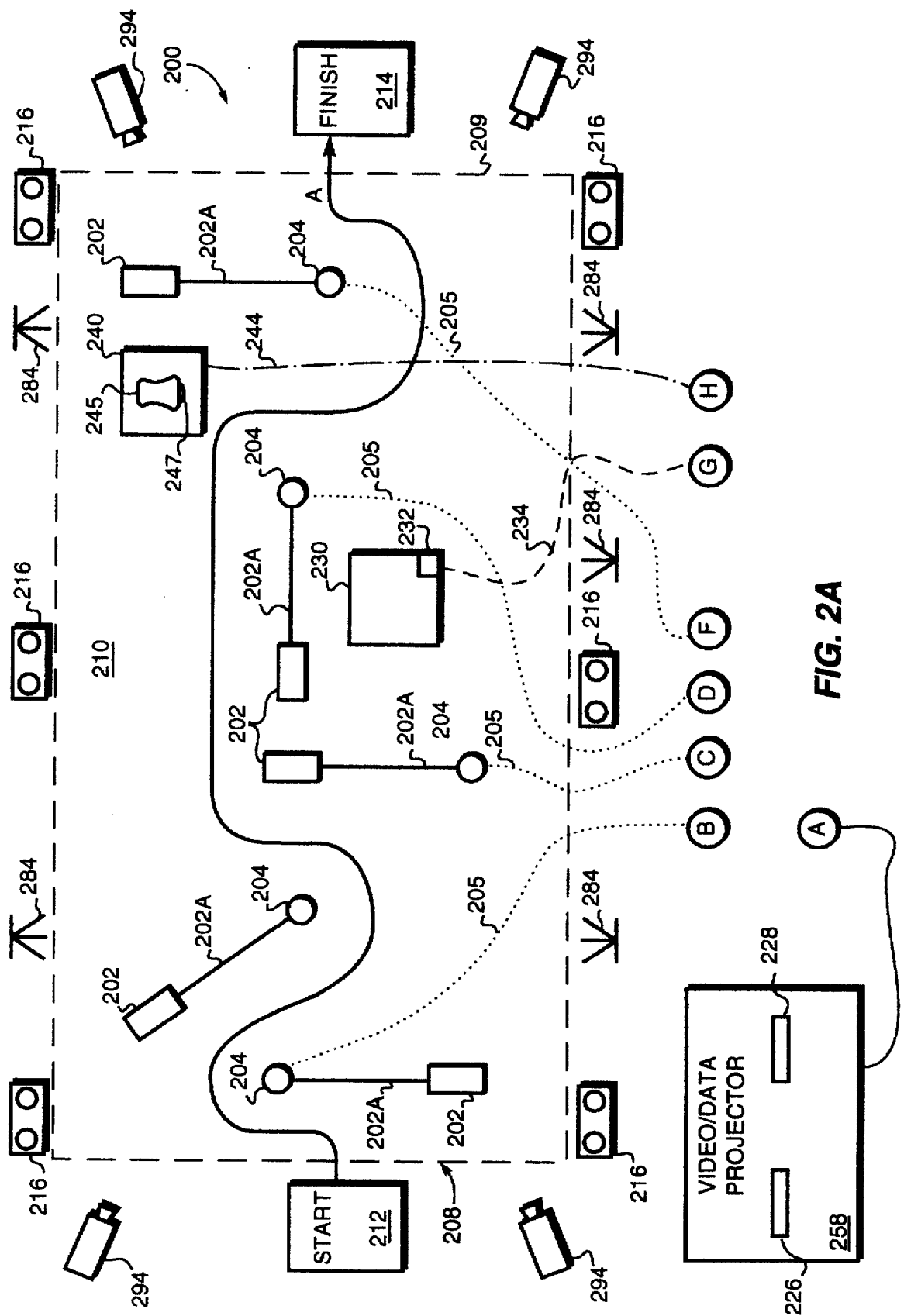
FIG. 2 is a highly schematic illustration of another embodiment of the present invention.

FIG. 1 illustrates a system 100 for use in team building or management training exercises or as a game that includes generally a plurality of monitors 102 capable of being triggered. Each monitor 102, moreover, has a corresponding sensor 104 that senses when the monitor 102 has been triggered. The monitors 102 and their corresponding sensors 104 are preferably configured and arranged within a given area 108 as an obstacle course 110. The obstacle course 110 has a starting point 112 and a finish 114 and preferably includes at least one "path" (as shown by arrow A) through the course 110 which, if followed, will not trigger any of the monitors 102, effectively defining a safe area that is fee of detection.

The area 108 is preferably the size of a tennis court, although it should be understood that the area 108 may be larger or smaller.

In the illustrated embodiment, the monitors 102 are laser generators. The laser generators 102 preferably emit low power laser beams 102A in the visible light spectrum so that the beams 102A may be seen by team members (not shown) traversing the course 110. Similarly, the sensors 104 are photodiode devices capable of detecting the frequency of the laser generators and aligned to receive a laser beam 102A of an associated laser generator 102. Since the laser beams 102A are often extremely thin and the receptors 104 present relatively small targets, slight movements in either the laser generator 102 or the sensor 104 may cause the beam 102A to move off the sensor 104 resulting in a false interruption signal. To correct this problem, a condensing lens (not shown) is preferably installed slightly ahead of the sensor 104 to diffuse the beam 102A into a wider diameter, so that such movements will not cause false interruptions.

To improve the discernability of the laser beams 102A, the team members may be provided with water spray bottles (not shown) such that the mist from the bottles reflects the light of the laser beams 102A, improving their discernability to the human eye. Alternatively, fog or smoke generators (not shown) may be disposed about the course 110 and/or the ambient lighting dimmed to improve the beams' discernability.

Although the invention is herein described utilizing laser generators as the monitors, it should be understood that the monitors 102 may comprise any combination of instruments such as proximity detectors, noise detectors, motion detectors, infrared (IR) detectors, weight detectors, pressure detectors, etc. in addition to laser generators. Moreover, the sensors may be separate from or integral with their associated monitors.

The system 100 further includes a control engine 120 which may have a plurality of channels 121. Each sensor 104 is preferably connected to a specific channel 121 of the control engine 120 via a sensor cable 105 which may be a standard copper connector. Preferably, the control engine 120 continuously receives status information (e.g., "on" or "off" signals) from the sensors 104 through the sensor cables 105 notifying the control engine 120 whenever a particular laser beam 102A is being interrupted. Since each sensor 104 is connected to the control engine 120 through a unique channel, in this aspect of the invention, the control engine 120 can associate and thereby identify each sensor 104 by its corresponding channel. Furthermore, by incorporating conventional speed controller/channel switching/sequencer circuitry (not shown) and pulse generators (not shown) within the control engine 120, the control engine 120 can also be programmed to transmit control signals to other aspects of the system 100 to tabulate and manifest the triggering of specific monitors 104, as described in more detail below.

Disposed about a perimeter 109 of the area 108 are a plurality of indicator lights 116. The indicator lights 116 are connected to the control engine 120 via indicator light cables (not shown). Each light 116 may include a red and a green element (not shown). During operation of the course 110, the indicator lights 116 preferably display the green element indicating that the course 110 is active. When any laser beam 102A is interrupted, however, the indicator lights 116 preferably flash the red elements.

Specifically, if a team (not shown) is negotiating the course 110 and a team member (not shown) interrupts a particular laser beam 102A, then the status information received by the control engine 120 for the associated sensor 104 changes (e.g., from "on" to "off"). In response, the control engine 120 preferably switches the indicator lights 116 from green to flashing red. When the laser beam 102A is thereafter re-connected with its associated sensor 104, the control engine 120 returns the lights 116 to green. The color of the indicator lights 116 thus provides interactive feedback to the team members whenever a laser generator (e.g., monitor) 102 is triggered.

It should be understood that the sensors 104 and the indicator lights 116 may be connected to the control engine 120 via other means such as telemetry, radio or infrared (IR) signals rather than being hard-wired through cables.

In addition to the indicator lights 116, the system 100 may further include an audio system 118 to play back an aural alarm associated with each laser beam 102A to the team on the course 110. The audio system 118 preferably includes a digital sampler 117 that contains a collection of synthesized or prerecorded sounds preferably in digital format that may be individually selected by the control engine 120 for play back over an amplifier/speaker system 119. The audio system 118 is preferably controlled by the control engine 120 through an input interface element (not shown) disposed therein such as a Musical Instrument Digital Interface ("MIDI") unit, which uses a standardized communications protocol to control the selection of sounds stored on the digital sampler 117.

More specifically, each channel 121 of the control engine 120 is associated with a corresponding MIDI channel of the MIDI unit and each MIDI channel is associated with a particular sound stored on the digital sampler 117. The output from the MIDI unit which instructs the sound system 118 to play back a preselected sound is then provided to the digital sampler 117. Thus, whenever the status information received by the control engine 120 from a particular sensor 104 changes indicating that the corresponding beam 102A has been interrupted, the MIDI unit within the control engine 120 directs the digital sampler 117 to play back a unique sound associated with that beam 102A over the amplifier/ speaker system 119. For example, the aural alarm associated with a first laser beam may represent the sound of breaking glass so that whenever a team member interrupts the first laser beam, the team hears the sound of breaking glass in addition to seeing the indicator lights 116 turn from green to flashing red. Similarly, the aural alarm associated with a second laser beam may represent the sound of a barking dog, whereas the aural alarm associated with a third laser beam 102A may represent the sound of dripping water and so on. The aural alarms thereby provide direct feedback to the team members as to which particular laser beam 102A within the course 110 has been or is being interrupted.

As an additional feature, the system 100 may include at least one electromechanical hazard 130 located somewhere on the course 110. The hazard 130, for example, may be a supply of water suspended above the course 110 having an electrically-operated valve 132. The valve 132 is preferably connected to a single channel 121 of the control engine 120 by a control wire 134. By providing a command signal over control wire 134, the control engine 120 can open the valve 132 causing it to "rain" on that portion of the course 110. The control engine 120 may be programmed, moreover, so that the control signal for opening the valve 132, is linked to a particular sensor (e.g., a proximity detector near the water supply). This programming of the control engine 120 may be accomplished by the switching circuitry and sequencers within the control engine 120 so that by triggering the monitor associated with that sensor the command for opening the valve 264 is transmitted by the control engine 120 through control wire 134. Alternatively, the command for opening the valve 134 may be linked to a timing circuit within the control engine 120 so that the valve 132 is opened at a preprogrammed time.

The system 100 also may include an electronic scoreboard 124 driven by the control engine 120. The scoreboard 124 preferably includes a counter 126 for displaying points (not shown) and a game clock 128 for showing elapsed time. The scoreboard 124, moreover, is preferably visible from the obstacle course 110 so that the team negotiating the course 110 can receive up-to-date feedback on its progress. The scoreboard 124 may be controlled by the control engine 120 via a driver (not shown) interconnected with the switching circuitry for incrementing the counter 126 each time a laser beam 102A (e.g., monitor 102) is interrupted by a team member negotiating the course 110.

The control engine 120 may also be programmed to increment the counter 126 in proportion to the amount of time that a single laser beam 102A is interrupted, thereby preventing someone from blocking a laser beam 102A to allow other team members to pass therethrough. More specifically, the control engine 120 preferably includes timing circuits (not shown) that operate in cooperation with the driver and switching circuits to increment the counter 126 if a laser beam 102A is interrupted for a preprogrammed amount of time (e.g., two seconds). The counter 126 thus constantly provides an up-to-the-minute indication of a team's performance through the obstacle course 110 and also provides an overall score at the end of the exercise with a lower score being better than a higher score. At the completion of a team's pass through the course 110, the control engine 120 can reset the counter 126 so that the system 100 is ready for the next team.

It should be understood that the counter 126 may be adjusted to start at a given figure (e.g., 1000) and count down so that a higher score is better than a lower score.

The control engine 120 also starts the game clock 128 at the beginning of each game and stops the clock 128 preferably after the last team member has reached the finish 114. The clock 128 thus displays the total time taken for a given team to negotiate the course 110. At the completion of a team's pass through the course 110, the control engine 120 preferably resets the clock 128.

In addition to the monitors 102 which are to be eluded by the team members, the obstacle course 110 may also include at least one interactive challenge station 140 that presents a discrete problem, task or question to be "solved" by the team members. As an illustrated example, the challenge station 140 is a puzzle such as a series of bent pipe pieces 141 that must be correctly arranged into a circular depression 142 and rotated in order to close a pair of electronic switches (not shown). The switches associated with the challenge station 140, moreover, are preferably connected to another channel 121 of the control engine 120 via wire 144. By solving the puzzle and thereby closing the switches, a signal is sent to the control engine 120 which may be programmed to tabulate and manifest that result. For example, the control engine 120 may decrement the counter 126 by a preselected "bonus" amount thereby improving the team's score.

It should be understood that the control engine 120 may be programmed to manifest a correct solution of the challenge station 140 in other ways. It should be further understood that the control engine 120 may include timing circuits so that the control engine 120 may be programmed to activate/deactivate certain monitors on a given schedule.

Referring to FIG. 2, in another aspect of the invention, a system 200 having many similar components as the system 100 of FIG. 1, including an obstacle course 210 formed from a plurality of monitors 202 and associated sensors 204, further includes a control engine 220 having a main processor 250. The main processor 250 is preferably a personal computer of the Macintosh® series of computers sold by Apple Computer, Inc., although the invention may also be practiced in the context of other types of computers, including the IBM® series of computers sold by International Business Machines Corp. These processors have resident thereon, and are controlled and coordinated by, operating system software, such as the Apple® System 7®, IBM OS2®, or the Microsoft® Windows® operating systems. The main processor 250 preferably includes input devices, such as a keyboard 252 and a mouse 254, and a display monitor 256 for interaction by a system administrator in a conventional manner. The main processor 250 also includes a memory (not shown) for the storage of information. As described in more detail below, an application program executing on the main processor 250 interacts with the operating system so as to provide the control engine 220 with added control over the system 200.

In this aspect of the invention, the control engine 220 may further include a processor/computer interface 222 that is preferably connected to and communicates with the main processor 250. The processor/computer interface 222 preferably includes an interface element such as the MIDI unit described above. The output of the MIDI unit, however, rather than going to a digital sampler 117 (FIG. 1) is preferably connected a serial communications port on the main processor 250, after passing through a MIDI to Serial Communications Converter (not shown) which converts the MIDI output into a format compatible with the main processor 250. The processor/computer interface 222 preferably adds a header to the status information associated with each sensor 204 containing a unique address identifier associated with that sensor. Thus, when the status information associated with a particular sensor 104 changes, the control engine 220 via the main processor 250 receives information indicating not only the change in status but also identifying which specific laser beam 102A has been interrupted.

It should be understood that other communications protocols and device controllers besides MIDI may be implemented in the control engine 220.

In this aspect of the invention, the scoreboard 124 (FIG. 1) is preferably replaced by a video/data projector 258 such as the Sony Model 1040Q connected to and controlled by the main processor 250 of the control engine 220. The output for the video/data projector 258 may be tied to the output for the display monitor 256 so that the images shown on the display monitor 256 also appear on the video/data projector 258. Alternatively, the video projector 258 can be separately controlled by, for example, commercial software products, to display a variety of images independent of the display monitor 256. Preferably, the video/data projector 258 displays a clock 228 showing elapsed time through the course and a numerical counter 226 showing points as described above.

In addition to the clock 228 and the counter 226, it should be understood that the video/data projector 258 may also be used to display a variety of other information, such as the rules of the obstacle course 210, course objective, hints for solving the course 210, the current order of teams to reach the finish 214, the number of penalties incurred by a team (as described below), the number of players on a team and their names, the number of players left stranded on the course 210, an indication of course difficulty or level, the amount of time, if any, by which team completes course ahead of allotted game time, etc. This information may be stored on the memory of the main processor 250 as conventional text files or it may be stored in files created by the application program as described below. A company could also use the video/data projector 258 to display corporate-specific information via the control engine 220 thereby further improving effectiveness of the system 200 as a training tool.

The control engine 220 preferably includes a collection of prerecorded or synthesized sounds preferably stored in the memory of the main processor 250 that may be selectively accessed and played back by the application program as described below. A power amplifier (not shown) and remote speakers (not shown) may be connected to an audio output of the main processor 250 so that the playback of sounds can be heard throughout the course 210. The play back of aural alarms via the main processor 250 is further described below.

The system 200 may also include at least one electromechanical hazard 230 located somewhere on the course 210 which may as in the earlier illustration be a supply of water suspended above the course 210 having an electrically-operated valve 232. In this aspect of the invention, the valve 232 is preferably connected to a device controller 249 within the control engine 220 that, in turn, is connected to the serial communications port of the main processor 250 via the MIDI to Serial Communications Converter. The device controller 249 preferably converts the serial communication from the main computer 250 to a signal capable of operating (e.g., opening or closing) the valve 232. The processor enhanced control engine 220 may be programmed to operate the valve 232 in a variety of ways. For example, command may be linked to a particular sensor so that by triggering the monitor associated with that sensor the command is transmitted, the command may be set to a timer so that the valve is opened after a preprogrammed amount of time has elapsed, the command may be entered at any time by the course administrator through the keyboard 252 or mouse 254 or the command may be linked to excessive time taken to negotiate that portion of the course 210 below the water supply hazard, etc.

It should be further understood that by utilizing other electro-mechanical devices, other hazards may be placed along the course 210 and controlled by the control engine 220. For example, a strobe light for temporarily disorienting the team members may similarly be connected to the control engine 220 so that the control engine 220 via the main processor 250 can turn the strobe light on and off at selected events or occasions or by the system administrator through the issuance of commands from the main processor 250. The control engine 220 can similarly control other physical elements such as a wall traveling on tracks by means of an electrically-controlled motor so that various sections of the course 210 can either be blocked off or made temporarily accessible, possibly dividing or "trapping" team members.

The system 200 also preferably includes at least one interactive challenge station 240 manipulated by the control engine 220 that similarly presents a discrete problem, task or question to be "solved" by the team negotiating the course 210. In this aspect of the invention, the challenge station 240, for example, may be a terminal 245 connected to the control engine 220 by a communications cable 244 to a separate channel 221 of the processor/computer interface 222. The terminal 245 preferably includes a display monitor 247 for presenting a question or series of questions to be answered by the team as it negotiates the course 210 and a microphone (not shown) and a voice recognition system (not shown) for receiving proposed solutions from the team. The control engine 220 may then broadcast the team's proposed aural answer over the sound system.

The team may either ignore the challenge station 240 (incurring penalty points as described below) or attempt to answer the question. The question(s) presented at the terminal 245 and the team's answer(s) may also be displayed on the video/data projector 258 to an audience. The answer provided by the team at the terminal 245 is then transmitted to the main computer 250 of the control engine 220 via the processor/computer interface 222 where it is compared to the correct answer stored in the memory as described below. By correctly answering the question, the terminal 245 may then be instructed by the control engine 220 via the main computer 250 to display hints on solving the next section of the course 210 or the team may be awarded bonus points or certain monitors 202 on the course 210 may be deactivated.

It should be understood that the challenge station 240 may comprise other interactive devices or may include a keyboard, mouse or touch sensitive screen for inputting answers. It should be understood that the challenge station 240 may also be semi-intelligent device that communicates with the control engine 220. It should be further understood that the control engine 220 or the challenge station 240 may impose a time limit on the team for solving the proposed task proposed by the challenge station 240.

As mentioned above, the application program executing on the main processor 250 of the control engine 220 is used to control the system 200. The application program is preferably a multimedia program, such as Macromedia Director, a commercially available high level programming language using Lingo. The control engine 220 as provided by the application program preferably interacts with and controls the various sensors 204, hazards 230, challenge stations 240, indicator lights 216, etc. disposed along the course 210.

Figure 3:
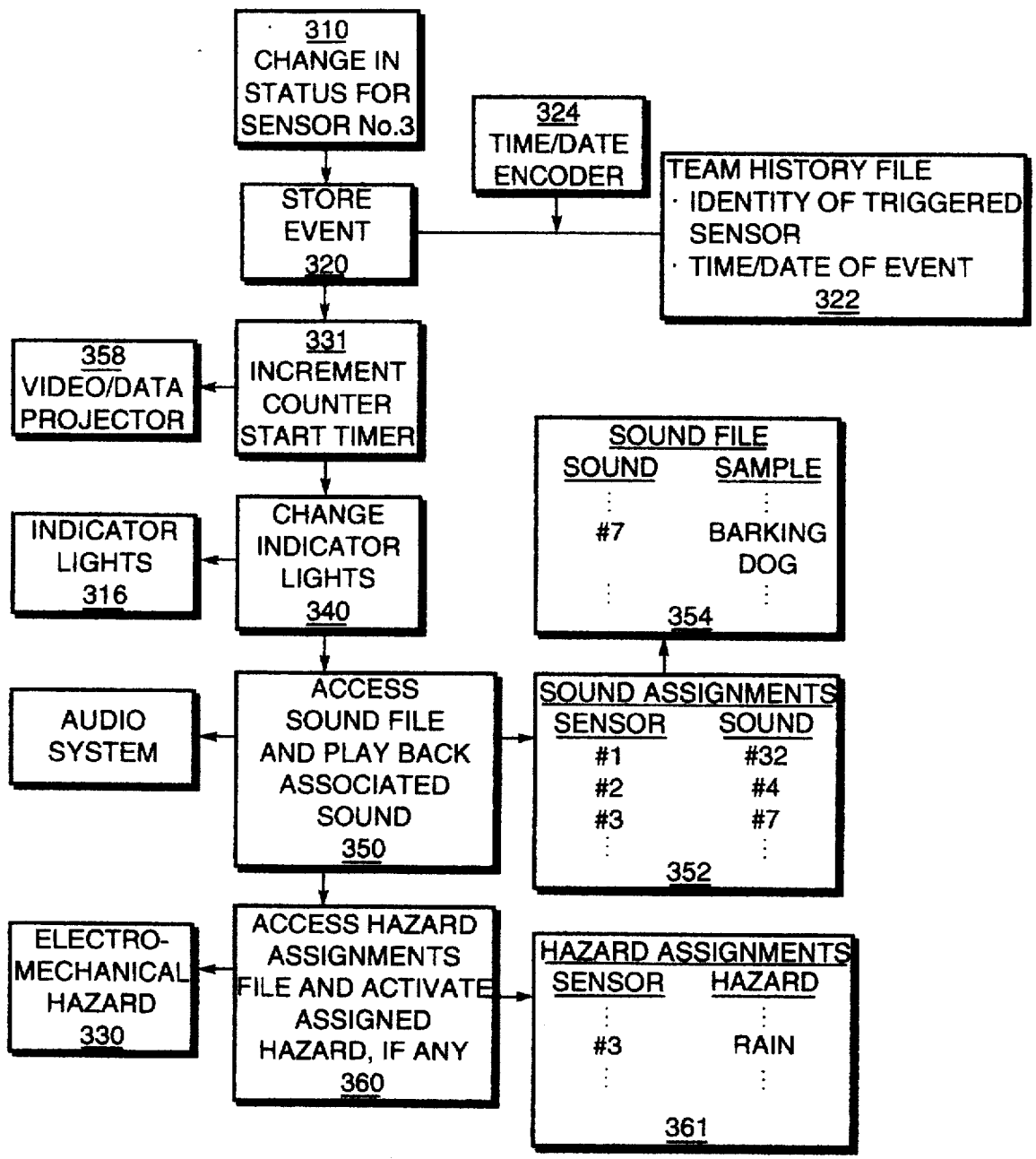
FIG. 3 is a flow chart illustrating the operation of a software module of the control engine.

The application program preferably includes a number of modules or subroutines written to perform the above described functions. FIG. 3 is a highly schematic flow chart of one such module illustrating the system's response to a change in status information for a particular sensor (e.g., sensor number 3), indicating the interruption of a monitor. First, the event 320 is preferably stored in a team history file 322 located in a portion of memory assigned to the application program by the operating system. More specifically, the identity of the triggered monitor is recorded and the time and date of the occurrence is noted via a time/date encoder 324. Preferably, a separate portion of memory is maintained by the application program for each team and each team's pass of the course to ease subsequent review and manipulation.

Next, the counter 226 on the video/data projector 224 is incremented and a timer 330 is started in order to continue incrementing the counter 226 if the status information remains unchanged, indicating that the monitor is being blocked. At the next step 340, the indicator lights 316 are directed by the control engine 220, for example, through the serial communications port of the main processor 250 and a device controller to change from green to flashing red.

It should be understood that in addition to the indicator lights 316, an LED message board (not shown) disposed in proximity to the course 210 (FIG. 2) may also be controlled by the main processor 250 of the control engine 220 to display, for example, a particular message to the team negotiating the course 210.

Next, the particular sound associated with the triggered monitor is identified, accessed and played back. Specifically, a sound assignments file 352 located in a portion of memory is accessed. The sound assignments file 352 links each sensor with the number or identity of a prerecorded or synthesized sounds stored by the main processor 250 of the control engine 220 in a sound file 354. The sound file 354 is then accessed in order to retrieve the particular digitized sound sample linked to that sensor. The digitized sound sample is then played back through the sound system.

It should be understood that by simply replacing the sound assignments file 352, new sounds may be linked to the various sensors located on the course 210 (FIG. 2).

It is then determined whether an electro-mechanical hazard 330 is assigned to the triggered sensor. Specifically, a hazard assignments file 361 stored in memory links the sensors with the electro-mechanical hazards. If the sensor for which the change in status information was received (e.g., sensor number 3) has an electro-mechanical hazard associated with it (e.g., the water supply), then the control engine 220 directs that electro-mechanical hazard (e.g., the valve) to be activated.

Figure 4:
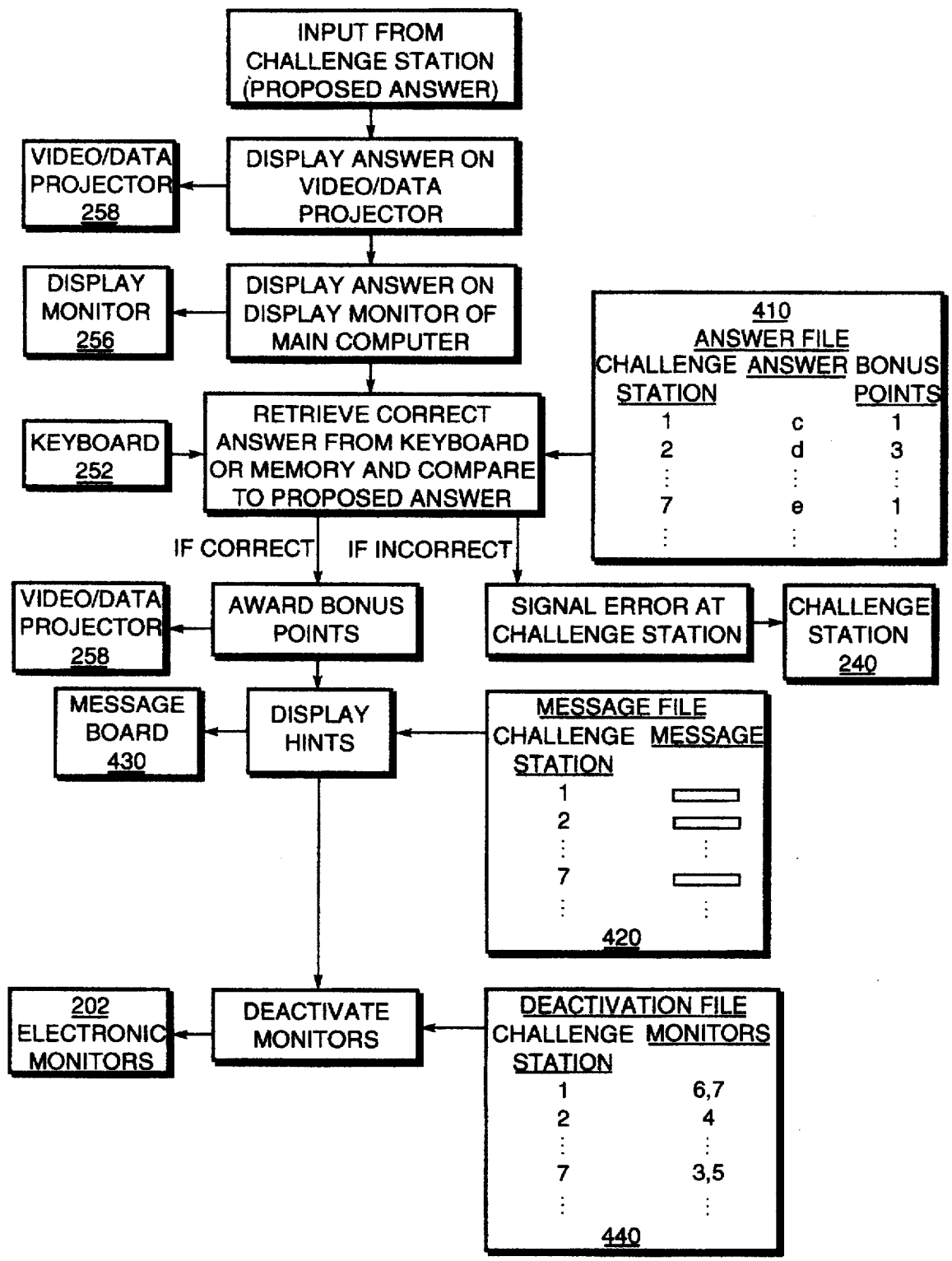
FIG. 4 is another flow chart illustrating the operation of another software module of the control engine.

FIG. 4 is a highly schematic flowchart of a software module illustrating the response to an input from a challenge station. As described above, the input or proposed answer from each challenge station is transmitted to the serial communications port of the main computer 250 via the data collection/computer interface device 220. First, the proposed answer may be displayed on the video/data projector 258 by the control engine 220 so that it may be seen by an audience observing the course 210. The proposed answer may also be displayed on the display screen 256 of the main computer 250.

Next, the proposed answer is compared to the correct answer for that challenge station. The correct answer may be inputted from the keyboard 252 of the main computer 250 by the system administrator or it may be retrieved from an answer file 410 stored in memory. If the proposed answer is correct, i.e., it matches the answer inputted by the system administrator or the stored answer, then the team may be awarded bonus points. The amount of bonus points for solving the challenge station 240 may be stored in the answer 410 file together with the answer. The bonus points may be displayed on the video/data projector 258 and are preferably stored by the main processor 250 in the team performance file for subsequent computation of the team's score. In addition to awarding the team bonus points, the control engine 220 may display hints on solving a subsequent portion of the course 210, e.g., where particular monitors might be located. The hints associated with a particular challenge station may be stored in a message file 420 in the memory of the main processor 250. The hints may be displayed on a message board 430, the video/data projector 258 or the display monitor 247 of the terminal 245.

In addition, certain electronic monitors may be deactivated by correctly solving the question proposed by the challenge station. The monitors to be deactivated may be listed in a deactivation file 440 stored in the memory of the main processor 250. Once the identification of the monitors to be deactivated has been accessed, the control engine 220 may ignore interruptions of those monitors.

If the proposed answer is incorrect (i.e., the proposed answer does not match the correct answer), then a error signal may be transmitted to the challenge station 240 by the control engine 220. For example, a red light at the challenge station 240 may be activated indicating a wrong answer or the terminal 245 may be directed to display an error message on the display monitor 247, etc.

It should be understood that the correct answer may be stored in a memory of a semi-intelligent challenge station so that the challenge station itself determines whether the correct answer has been provided and so notifies the control engine 220.

It will be apparent to those skilled in the art that other software modules or subroutines may be similarly developed based on the functional descriptions provided herein.

The control engine 220 may also control the layout of the course 210 by turning specific laser beams 202A (e.g., monitors) on and off. For example, the control engine 220 in response to inputs from the course administrator at the main processor 250 may either ignore or acknowledge a change in the status information received from the sensors. By simply ignoring the change in status information from a particular sensor (indicating that its laser beam has been interrupted), the control engine 220 is effectively removing that laser beam (e.g., monitor) from the course 210. Similarly, by acknowledging certain sensors that were previously being ignored, the control engine 220 is effectively making those laser beams (e.g., monitors) active. Alternatively, the monitors 202 themselves may be connected directly to the control engine 220 through the main processor 250 and the processor/computer interface 222 so that the laser generators may be activated or deactivated directly (e.g., the laser generators turned off).

In addition to the identity of the triggered monitors and the time/date of each occurrence (BB), the control engine 220 preferably via the application program also stores any penalty points (PP) assessed against a team negotiating the course 210. For example, if a team skips a challenge station 240, the control engine 220 may be programmed to assess penalty points against the team and record this information in a portion of memory of the main processor 250 assigned to that team. The control engine 220 may further be programmed to record (e.g., store in the memory of the processor 250) the time taken for each team to complete the course 210, the number of team members, if any, who did not complete the course (PS), the amount of time, if any, by which the team completed the course 210 ahead of an allotted time (TA) and the bonus points, if any, awarded to the team for solving a challenge station (CP).

Following each team's completion of the course 210, the above information may be manipulated by the control engine 220 preferably through the main processor 250 to provide an overall score for the team. For example, the control engine 220 may be programmed to implement the following equation to arrive at a score for each team:

$$(a)BB+(b)PP+(c)PS-(d)TA-(e)CP=\text{Team Score}.$$

where a, b, c, d and e are "weighting" coefficients. The weighting coefficients may be altered in order to increase, decrease, or remove an element from the equation thereby accounting for the complexity of the course and/or to focusing the team on a specific aspect of the course 210. The weighting coefficients may also be altered in order to permit the scores of various teams running different courses to be compared against each other.

It should be understood that other score equations may be used or that other factors may be considered in arriving at team scores. It should be further understood that any of this information or any portion thereof may be displayed in real time by the control engine 220 to the team on the video/data projector 224 and/or to the course administrator on the display screen 256 (FIG. 2).

Referring again to FIG. 2, the control engine 220, in addition to the main processor 250, may include other computers or processors networked to the main processor 250 to provide additional functionality. For example, a tracking computer 280 networked to the main processor 250 through a computer network link 282 may be used to track and monitor the location of each team member as he or she negotiates the course 210. The network link 282 may be any conventional high speed network such as an ethernet or Fiber Distributed Data Interface ("FDDI").

Each team member preferably carries a transmitter (not shown) that transmits a unique signal associated with that team member. Disposed about the perimeter 209 of the course 210 is a plurality of triangulation transceivers 284 that are connected to the tracking computer 280. The triangulation transceivers 284 periodically poll each of the transmitters carried by the team members. The responses received from the transmitters and the time taken to receive those responses are sent to the tracking computer 280 of the control engine 220. Using conventional triangulation techniques and algorithms, the exact location of each team member can be determined by the control engine 220 via the tracking computer 280 at each poll cycle. This team member/location data is preferably time/date encoded and placed in a separate file which may then be accessed over the network via the communications link 282 by the main processor 250.

This data can then be manipulated and displayed by the control engine 220 either singly or in combination with the other information maintained by the main processor 250 (such as the number of monitors triggered and the time of triggering, etc.) on the video/data projector 258 to provide real time information to the team negotiating the course 210. More specifically, each team member can receive up-to-the-minute performance statistics such as number of errors (i.e., monitors triggered by that team member), distanced traveled on the course, number of errors per distance traveled, location of each member on the course 210, etc. The team member/location data may also be stored for subsequent manipulation as described below.

To provide additional feedback and performance review, the control engine 220 may also include a graphics workstation 290 networked to the main processor 250 and the tracking computer 280 through the communications link 282. The graphics workstation 290 which includes a graphical display 292 may be any commercially available 2-D or 3-D workstation such as those manufactured and sold by Silicon Graphics. The workstation 290 includes a compatible software package (not shown) such as Vega from Paradigm Corporation capable of rendering instant replay simulation. The software package is preferably preprogrammed with the location and type of each monitor 202, hazard 262, indicator light 216 and challenge station 270 so that the workstation 290 may display a simulated representation of the entire obstacle course 210 or portions thereof.

Following a team's performance through the course 210, the control engine 220 via the workstation 290 may present an animated, graphical simulation of the team's performance. For example, by accessing the time/date encoded information stored on the main processor 250 regarding the team's triggering of monitors (e.g., at the team history file 322 (FIG. 3)), the workstation 290 can present a simulated representation of those events on the graphical display 292 in real time. Similarly, by accessing the team member/location data described above from either the main processor 250 or the tracking computer 280, the graphics workstation 290 can overlay the movements of each team member on the graphical representation of the course 210. More specifically, using conventional graphical techniques each team member may be represented by a player object, such as a colored sphere. Each player object, moreover, may be associated with a particular team member and/or team through the use of color codes or name tags attached to the player objects.

As a result, the control engine 220 via the workstation 290 is capable of providing an animated representation of the team's interaction with the course 210. The workstation 290, moreover, may also include a sound system (not shown) so that the aural alarms heard by the team members as they triggered particular monitors may also be recreated during the graphical simulation.

In addition, a plurality of video cameras 294 may be disposed about the perimeter 209 of the course 210. The video cameras 294 may be fixed to record specific portions of the course 210 or the cameras 294 may be operated by camera crews (not shown) to follow team members through portions of the course 210. The video cameras 294 are preferably connected to the serial communications port of the main processor 250 of the control engine 220 so that the video image information may be time/date encoded by the main processor 250 and stored on the memory. The video image information may be displayed on the video/data projection 258 in real time by the control engine 220 or the video image information may be played back following the team's completion of the course 210.

Alternatively, the video image information may be played back on a portion or window of the graphical display 292 of the graphics workstation 290 of the control engine 220. Since the video image information is time/date encoded, it may be played back in synchronization with the simulated representation described above.

Although the processor enhanced control engine 220 has been described as using at least three separate processors or computers operating simultaneously, it should be understood that a single processor or computer having sufficient speed, memory and multitasking capability could be used to perform all these functions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for management training a team having a plurality of members, the system having a plurality of monitors and associated sensors disposed within a space, each of the monitors and associated sensors defining a monitor region wherein a respective sensor is triggered in response to the presence of at least one team member in the monitor region and further defining a plurality of safe areas remote from all of the monitor regions in which no sensor is triggered, each of the monitors and associated sensors including a transmitter that generates a signal in response to triggering of the respective sensor, the signals being representative of status information, the system comprising:

an obstacle course that is negotiated by the members of the team, the course being formed from an arrangement of the predefined monitor regions and configured within the space so that the safe areas wherein no sensor is triggered extend contiguously along the obstacle course remote from all of the monitor regions, allowing the members of the team to negotiate the course without triggering the sensors by remaining within the contiguous safe areas;

a control engine coupled to each transmitter so as to receive the signals from the plurality of monitors and associated sensors in real time, the control engine including means for tabulating the status information;

a scoreboard, operatively connected to the control engine, for displaying the results of the tabulation in real time to the team negotiating the obstacle course; and at least one warning device, operatively connected to the control engine, for providing at least one of auditory and visual feedback information to the team negotiating the obstacle course, wherein the control engine only activates the at least one warning device while at least one team member is within a monitor region so as to assist the team in locating and thereby remaining within the safe areas while negotiating the obstacle course.

2. The system of claim 1 wherein the at least one warning device comprises an indicator light disposed along the obstacle course, the light being activated by the control engine only while at least one team member is within a monitor region.

3. The system of claim 2 wherein the at least one warning device further comprises an audio system disposed in proximity to the obstacle course for reproducing a plurality of sounds and each of two or more monitors is associated with a different sound, whereby the control engine only activates the audio system while at least one team member is within a respective monitor region by directing the audio system to reproduce the sound with which the respective monitor is associated.

4. The system of claim 3 wherein the scoreboard comprises a counter and the control engine adjusts the counter in response to the triggering of a sensor corresponding to the presence of a team member in a respective monitor region.

5. The system of claim 4 further comprising at least one challenge station disposed along the obstacle course, the at least one challenge station configured to present a task that may be performed by at least one team member and to generate challenge station signals in response to an input by the at least one team member, the control engine coupled to the at least one challenge station and including means for tabulating the challenge station signals.

6. The system of claim 5 further comprising at least one electro-mechanical hazard operatively disposed along the obstacle course, the at least one electro-mechanical hazard operatively coupled to the control engine and configured to modify the course conditions as commanded by the control engine.

7. The system of claim 6 wherein the control engine includes a main processor for use in tabulating the status information in accordance with a predetermined scoring equation and a memory associated with the main processor for use in storing the tabulation results.

* * * * *

UNITED STATES PATENT AND TRADEMARK OFFICE
CERTIFICATE OF CORRECTION

PATENT NO. : 5,762,503

DATED : June 9, 1998

INVENTOR(S) : Joel Hoo, et al.

Page 1 of 2

Figure 2B:
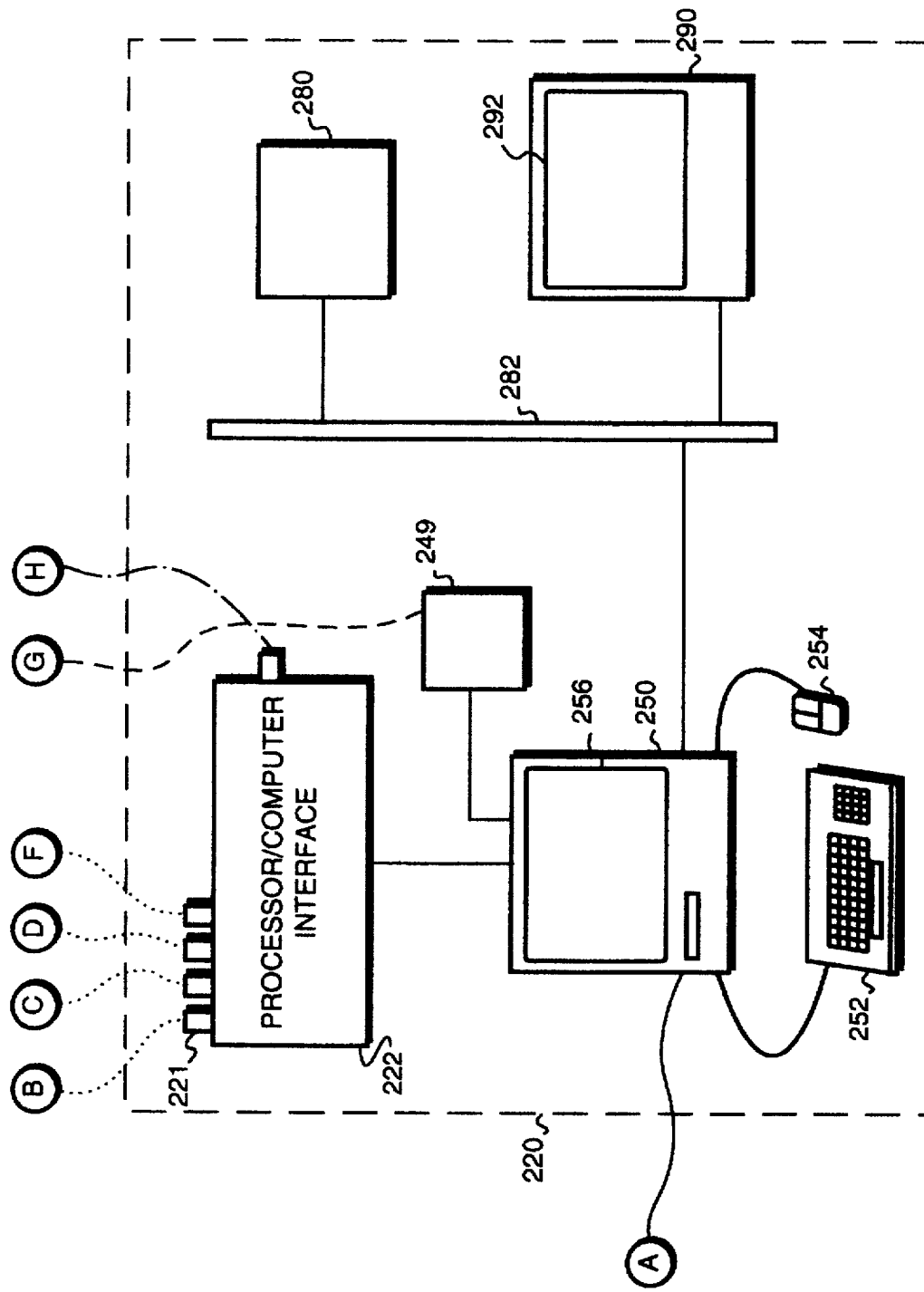

It is certified that error appears in the above-identified patent and that said Letters Patent is hereby corrected as shown below:

Column 5, line 57, change "FIG. 2" to --FIGS. 2A and 2B are--.

Column 8, line 12, change "264" to --132--.

Column 9, line 12, change "FIG. 2" to --FIGS. 2A and 2B--.

Column 9, line 16, after "control engine 220" insert --(FIG. 2B)--.

Column 11, line 65, change "224" to --258--.

Column 12, line 8, change "FIG. 2" to --FIG. 2A--.

Column 12, line 24, change "FIG. 2" to --FIG. 2A--.

Column 14, line 10, change "224" to --258--.

Column 14, line 11, change "FIG. 2" to --FIG. 2B--.

UNITED STATES PATENT AND TRADEMARK OFFICE
CERTIFICATE OF CORRECTION

PATENT NO.   : 5,762,503
DATED        : June 9, 1998
INVENTOR(S)  : Joel Hoo, et al.

It is certified that error appears in the above-identified patent and that said Letters Patent is hereby corrected as shown below:

Column 14, line 12, change "FIG. 2" to --FIGS. 2A and 2B--.

Column 14, line 12, after "control engin 220" insert -- (FIG. 2B)--

Signed and Sealed this

Ninth Day of March, 1999

Attest:

Attesting Officer

Q. TODD DICKINSON

Acting Commissioner of Patents and Trademarks